(12) United States Patent
Mellet et al.

(10) Patent No.: US 9,074,662 B2
(45) Date of Patent: Jul. 7, 2015

(54) BINARY AND FRICTION CLUTCH ASSEMBLY

(71) Applicant: GM Global Technology Operations LLC, Detroit, MI (US)

(72) Inventors: Edward W. Mellet, Rochester Hills, MI (US); James M. Hart, Belleville, MI (US); Daryl A. Wilton, Macomb, MI (US)

(73) Assignee: GM Global Technology Operations, LLC, Detroit, MI (US)

(*) Notice: Subject to any disclaimer, the term of this patent is extended or adjusted under 35 U.S.C. 154(b) by 95 days.

(21) Appl. No.: 13/850,590

(22) Filed: Mar. 26, 2013

(65) Prior Publication Data

US 2013/0267372 A1 Oct. 10, 2013

Related U.S. Application Data

(60) Provisional application No. 61/620,115, filed on Apr. 4, 2012.

(51) Int. Cl.
| | |
|---|---|
| F16D 21/00 | (2006.01) |
| F16H 3/62 | (2006.01) |
| F16H 3/66 | (2006.01) |
| F16D 23/06 | (2006.01) |
| F16D 25/061 | (2006.01) |
| F16D 11/14 | (2006.01) |

(52) U.S. Cl.
CPC ............ *F16H 3/62* (2013.01); *F16D 21/00* (2013.01); *F16H 3/66* (2013.01); *F16H 2200/0073* (2013.01); *F16H 2200/2012* (2013.01); *F16H 2200/2046* (2013.01); *F16D 11/14* (2013.01); *F16D 23/06* (2013.01); *F16D 25/061* (2013.01); *F16D 2023/0643* (2013.01); *F16D 2023/0693* (2013.01)

(58) Field of Classification Search
USPC .......................................... 475/278, 138, 139
See application file for complete search history.

(56) References Cited

U.S. PATENT DOCUMENTS

| | | | |
|---|---|---|---|
| 2,109,007 | A * | 2/1938 | Floss ............................ 74/473.1 |
| 8,303,455 | B2 | 11/2012 | Gumpoltsberger et al. |
| 8,425,370 | B2 | 4/2013 | Leesch et al. |
| 2004/0102278 | A1 | 5/2004 | Usoro et al. |
| 2005/0241903 | A1* | 11/2005 | Rebholz .................. 192/53.361 |
| 2008/0108472 | A1 | 5/2008 | Seo |
| 2009/0017976 | A1* | 1/2009 | Phillips et al. ................. 475/276 |
| 2011/0124462 | A1* | 5/2011 | Meyer et al. .................. 475/271 |
| 2011/0251014 | A1* | 10/2011 | Leesch et al. ................. 475/296 |
| 2012/0010038 | A1 | 1/2012 | Hart et al. |
| 2013/0267370 | A1 | 10/2013 | Mellet et al. |
| 2013/0267371 | A1 | 10/2013 | Mellet et al. |
| 2013/0267372 | A1 | 10/2013 | Mellet et al. |
| 2013/0267373 | A1 | 10/2013 | Mellet et al. |

* cited by examiner

*Primary Examiner* — Derek D Knight
*Assistant Examiner* — David Morris

(57) ABSTRACT

A transmission is provided having an input member, an output member, four planetary gear sets, a plurality of coupling members and a plurality of torque transmitting devices. Each of the planetary gear sets includes first, second and third members. The torque transmitting devices include clutches and brakes actuatable in combinations of two to establish a plurality of forward gear ratios and one reverse gear ratio. One of the torque transmitting devices includes a friction clutch and a binary clutch which have a spring-ball structure disposed therebetween.

11 Claims, 8 Drawing Sheets

| GEAR STATE | GEAR RATIO | RATIO STEP | TORQUE TRANSMITTING ELEMENTS | | | | | |
|---|---|---|---|---|---|---|---|---|
| | | | 36 | 34 | 32 | 26 | 24 | 28 |
| REV1 | -4.563 | | | X | X | | | X |
| REV2 | -6.019 | | X | X | X | | | |
| N | | | | | | | | |
| 1ST | 4.935 | | | | X | X | | X |
| 2ND | 3.445 | 1.43 | X | | X | X | | |
| 3RD | 2.257 | 1.53 | X | | | X | | X |
| 4TH | 1.886 | 1.20 | X | X | | X | | |
| 5TH | 1.422 | 1.33 | | X | | X | | X |
| 6TH | 1.255 | 1.13 | X | | | X | X | |
| 7TH | 1.000 | 1.25 | | | | X | X | X |
| 8TH | 0.893 | 1.12 | | X | | X | X | |
| 9TH | 0.800 | 1.12 | | X | | | X | X |
| 10TH | 0.767 | 1.04 | X | X | | | X | |
| 11TH | 0.681 | 1.13 | X | | | | X | X |

X = ON - ENGAGED CARRYING TORQUE

FIG. 3

BINARY AND FRICTION CLUTCH ASSEMBLY

CROSS-REFERENCE TO RELATED APPLICATION

This application claims the benefit of U.S. Provisional Application No. 61/620,115 filed Apr. 4, 2012, which is incorporated herein by reference in its entirety.

FIELD

The invention relates generally to a multiple speed transmission, and more particularly, to a transmission having a plurality speeds, planetary gear sets and torque transmitting devices.

BACKGROUND

The statements in this section merely provide background information related to the present disclosure and may or may not constitute prior art.

A typical multiple speed transmission uses a combination of friction clutches, planetary gear arrangements and fixed interconnections to achieve a plurality of gear ratios. The number and physical arrangement of the planetary gear sets, generally, are dictated by packaging, cost and desired speed ratios.

In addition, different types of clutches, or torque transmitting mechanisms, are used in automatic transmissions depending on the desired shifting needs. Friction clutches generally have a smooth transmission; however, they have a low torque capacity. Binary clutches, such as dog clutches or band clutches, have a high torque capacity, but they typically have a hard shift transition.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need for an improved, cost-effective, compact multiple speed transmission.

SUMMARY

A transmission is provided having an input member, an output member, four planetary gear sets, a plurality of coupling members and a plurality of torque transmitting devices. Each of the planetary gear sets includes first, second and third members. The torque transmitting devices are for example clutches and brakes.

The clutches and brakes can be of any type including but not limited to a friction clutch, a friction band, a one way clutch, a selectable one way clutch, a dog clutch, a synchronizer and similar devices. Furthermore, any node can use a single device or a combination of these devices e.g. the first brake may be configured as a dog clutch and a one way clutch combination or a one way clutch and friction clutch combination. Similarly, several other combinations are possible.

In one aspect, which may be combined with or separate from the other aspects herein, a torque transmitting device assembly for selectively transmitting torque between a first member and a second member is provided. The torque transmitting device includes a friction clutch having a backing plate structure against which the friction clutch acts, a biasing member disposed in the backing plate structure with a ball disposed adjacent to the biasing member, and a binary clutch disposed adjacent to the backing plate structure.

In another aspect, which may be combined with or separate from the other aspects herein, a transmission is provided that includes an input member, an output member, first, second, third and fourth planetary gear sets each having first, second and third members, three interconnecting members continuously interconnecting a member of the first, second, third and fourth planetary gear sets with another member of the first, second, third and fourth planetary gear sets, and six torque transmitting mechanisms. Three of the six torque transmitting mechanisms are each selectively engageable to interconnect at least one of the first, second and third members with at least one other of the first, second, third members. Three of the six torque transmitting mechanisms are each selectively engageable to interconnect at least one of the first, second and third members with the stationary member. The six torque transmitting mechanisms are selectively engageable in combinations of at least three to establish a plurality of forward speed ratios and at least one reverse speed ratio between the input member and the output member. A first of the six torque transmitting mechanisms includes a friction clutch having a backing plate structure against which the friction clutch acts, a biasing member disposed in the backing plate structure with a ball disposed adjacent to the biasing member, and a binary clutch disposed adjacent to the backing plate structure.

In another aspect, which may be combined with or separate from the other aspects described herein, a transmission is provided that includes an input member, an output member, first, second, third and fourth planetary gear sets each having a sun gear, a carrier member and a ring gear, wherein the input member is continuously connected for common rotation with the sun gear of the first planetary gear set, and wherein the output member is continuously connected for common rotation with the ring gear of the fourth planetary gear set, three interconnecting members and six torque transmitting mechanisms.

The first interconnecting member continuously interconnects the carrier member of the first planetary gear set with the ring gear of the third planetary gear set. The second interconnecting member continuously interconnects the ring gear of the first planetary gear set with the carrier member of the second planetary gear set. The third interconnecting member continuously interconnects the ring gear of the second planetary gear set with the carrier member of the third planetary gear set and the sun gear of the fourth planetary gear set.

The first torque transmitting mechanism is selectively engageable to interconnect the sun gear of the first planetary gear set and the input member with the carrier member of the fourth planetary gear set. The second torque transmitting mechanism is selectively engageable to interconnect the carrier member of the first planetary gear set and the ring gear of the third planetary gear set with the carrier member of the fourth planetary gear set. The third torque transmitting mechanism is selectively engageable to interconnect the carrier member of the fourth planetary gear set with the stationary member. The fourth torque transmitting mechanism is selectively engageable to interconnect the sun gear of the third planetary gear set with the stationary member. The fifth torque transmitting mechanism is selectively engageable to interconnect the sun gear of the second planetary gear set with the stationary member. The sixth torque transmitting mechanism is selectively engageable to interconnect the ring gear of the second planetary gear set and the carrier member of the third planetary gear get set with one of the following: a) the sun gear of the second planetary gear set; or b) the carrier member of the second planetary gear set and the ring gear of the first planetary gear set. The torque transmitting mechanisms are selectively engageable in combinations of at least three to establish a plurality of forward speed ratios and at least one reverse speed ratio between the input member and the output member.

The second torque transmitting mechanism includes a friction clutch having a backing plate structure against which the friction clutch acts, a first biasing member disposed in the backing plate structure with a ball disposed adjacent to the first biasing member, and a binary clutch disposed adjacent to the backing plate structure. The second torque transmitting mechanism also has an actuator configured to engage both the friction clutch and the binary clutch. The actuator is configured to apply a first pressure to the friction clutch to engage the friction clutch while the binary clutch remains disengaged in a first engaged position. The actuator is further configured to apply a second pressure to the friction clutch to engage the binary clutch in a second engaged position. The second pressure is greater than the first pressure.

The second torque transmitting mechanism further includes a second biasing member and a stop. The second biasing member is disposed between the stop and the backing plate structure. The second biasing member is configured to bias the backing plate structure away from the binary clutch. The binary clutch is disposed adjacent to the friction clutch. The friction clutch is disposed between the binary clutch and the actuator.

The second torque transmitting device further includes a detent member having a surface forming a curved detent therein. The ball is biased into the curved detent by the first biasing member. The ball is configured to seat in the curved detent in an unengaged position of the second torque transmitting mechanism and in the first engaged position. The actuator being operable to unseat the ball from the curved detent in the second engaged position. The backing plate structure is configured to slide axially with respect to the detent member when being acted on by the actuator in the second engaged position. The surface forming the detent has a ramped surface edge, and the ball is configured to roll up the ramped surface edge and compress the first biasing member in the second engaged position.

Further features, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

FIG. 3 is a truth table presenting the state of engagement of the various torque transmitting elements in each of the available forward and reverse speeds or gear ratios of the transmissions illustrated in FIGS. 1 and 2;

DETAILED DESCRIPTION

The following description is merely exemplary in nature and is not intended to limit the present disclosure, application, or uses.

At the outset, it should be appreciated that the embodiments of the eleven speed automatic transmission of the present invention have an arrangement of permanent mechanical connections between the elements of the four planetary gear sets. As used herein, coupling or interconnection refers to a direct, continuous, and permanent coupling or interconnection, for example by a rigid member or shaft, between elements. Selective coupling or interconnection, on the other hand, refers to a selective coupling by a clutch or brake, where the clutch or brake can be engaged and disengaged, such that when engaged, the selectively coupled or interconnected elements rotate together, but when disengaged, the selectively coupled or interconnected elements are free to rotate independently.

In one embodiment, a second component or element of a first planetary gear set is permanently coupled to a first component or element of a third planetary gear set. A third component or element of the first planetary gear set is permanently coupled to a second component or element of a second planetary gear set. A first component or element of the second planetary gear set is permanently coupled to a second component or element of a third planetary gear set and to a third component or element of a fourth planetary gear set.

Figure 1:
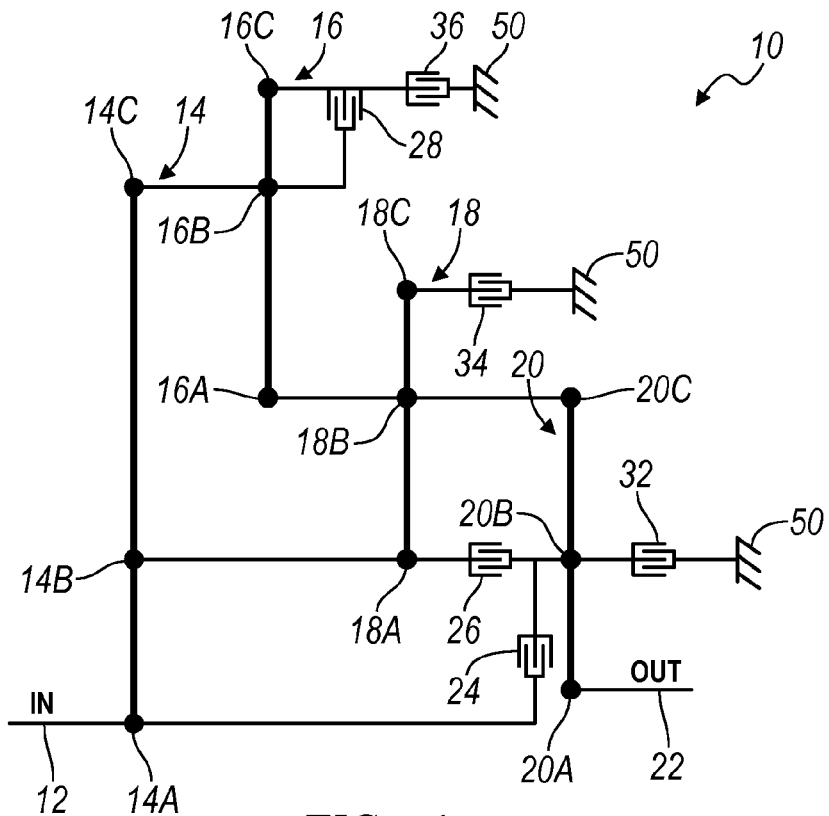
FIG. 1 is a lever diagram of an embodiment of an eleven speed transmission according to the principles of the present invention.

Referring now to FIG. 1, an embodiment of an eleven speed transmission 10 is illustrated in a lever diagram format. A lever diagram is a schematic representation of the components of a mechanical device such as an automatic transmission. Each individual lever represents a planetary gear set wherein the three basic mechanical components of the planetary gear are each represented by a node. Therefore, a single lever contains three nodes: one for the sun gear, one for the planet gear carrier, and one for the ring gear. In some cases, two levers may be combined into a single lever having more than three nodes (typically four nodes). For example, if two nodes on two different levers are interconnected through a fixed connection they may be represented as a single node on a single lever. The relative length between the nodes of each lever can be used to represent the ring-to-sun ratio of each respective gear set. These lever ratios, in turn, are used to vary the gear ratios of the transmission in order to achieve an appropriate ratios and ratio progression. Mechanical couplings or interconnections between the nodes of the various planetary gear sets are illustrated by thin, horizontal lines, and torque transmitting devices such as clutches and brakes are presented as interleaved fingers. Further explanation of the format, purpose and use of lever diagrams can be found in SAE Paper 810102, "The Lever Analogy: A New Tool in Transmission Analysis" by Benford and Leising which is hereby fully incorporated by reference.

The transmission 10 includes an input shaft or member 12, a first planetary gear set 14, a second planetary gear set 16, a third planetary gear set 18, a fourth planetary gear set 20, and an output shaft or member 22. In the lever diagram of FIG. 1, the first planetary gear set 14 has three nodes: a first node 14A, a second node 14B, and a third node 14C. The second planetary gear set 16 has three nodes: a first node 16A, a second node 16B and a third node 16C. The third planetary gear set 18 has three nodes: a first node 18A, a second node 18B and a third node 18C. The fourth planetary gear set 20 has three nodes: a first node 20A, a second node 20B and a third node 20C.

The input member 12 is continuously coupled to the first node 14A of the first planetary gear set 14. The output member 22 is continuously coupled to the first node 20A of the fourth planetary gear set 20.

The second node 14B of the first planetary gear set 14 is coupled to the first node 18A of the third planetary gear set 18. The third node 14C of the first planetary gear set 14 is coupled to the second node 16B of the second planetary gear set 16. The first node 16A of the second planetary gear set 16 is coupled to the third node 18B of the third planetary gear set 18 and to the third node 20C of the fourth planetary gear set 20.

A first clutch 24 selectively connects the first node 14A of the first planetary gear set 14 with the second node 20B of the fourth planetary gear set 20. A second clutch 26 selectively connects the second node 14B of the first planetary gear set 14 and the first node 18A of the third planetary gear set 18 with the second node 20B of the fourth planetary gear set 20. A third clutch 28 selectively connects the third node 14C of the first planetary gear set 14 and the second node 16B of the second planetary gear set 16 with the third node 16C of the second planetary gear set 16.

A first brake 32 selectively connects the second node 20B of the fourth planetary gear set 20 with the stationary member or transmission housing 50. A second brake 34 selectively connects the third node 18C of the third planetary gear set 18 with the stationary member or transmission housing 50. A third brake 36 selectively connects the third node 16C of the second planetary gear set 16 with the stationary member or transmission housing 50.

Figure 2:
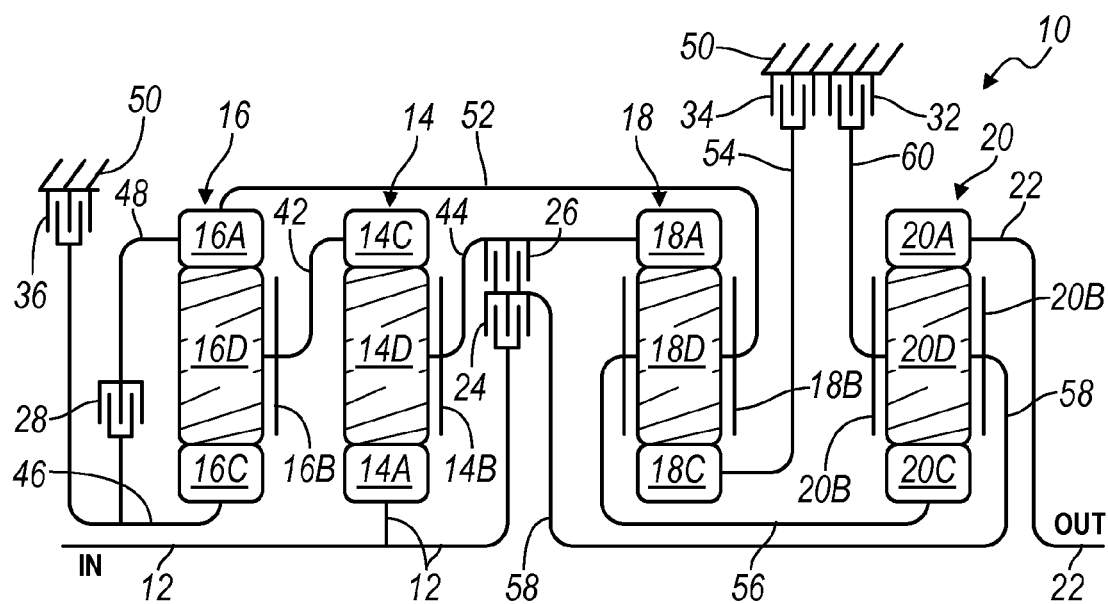
FIG. 2 is a diagrammatic illustration of an embodiment of an eleven speed transmission, in accordance with the principles of the present invention.
Figure 4A:
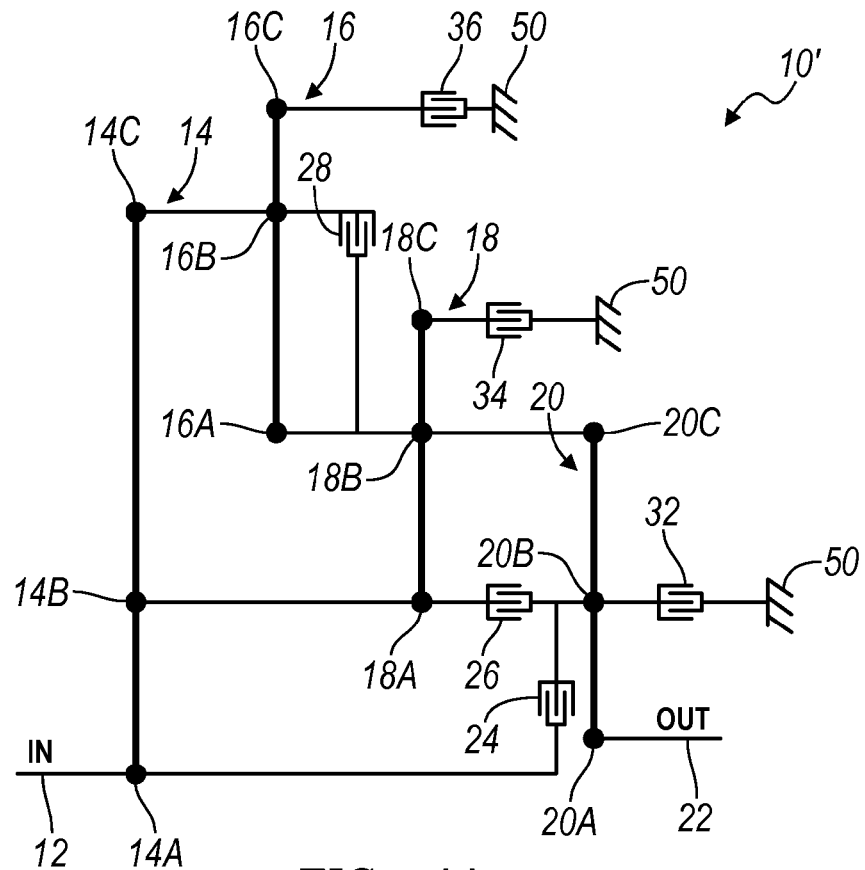
FIGS. 4A, 4B, 5A, 5B, 6A and 6B are diagrammatic illustrations of a variation interconnections of the third clutch 28 according to the principles of the present invention.
Figure 4B:
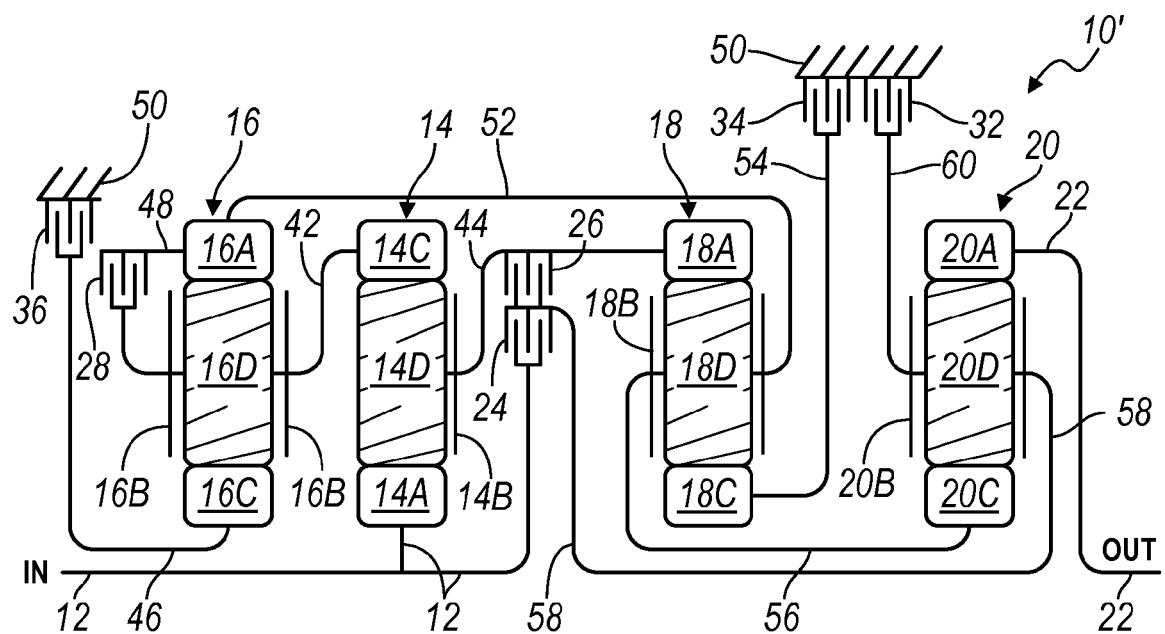
Figure 5A:
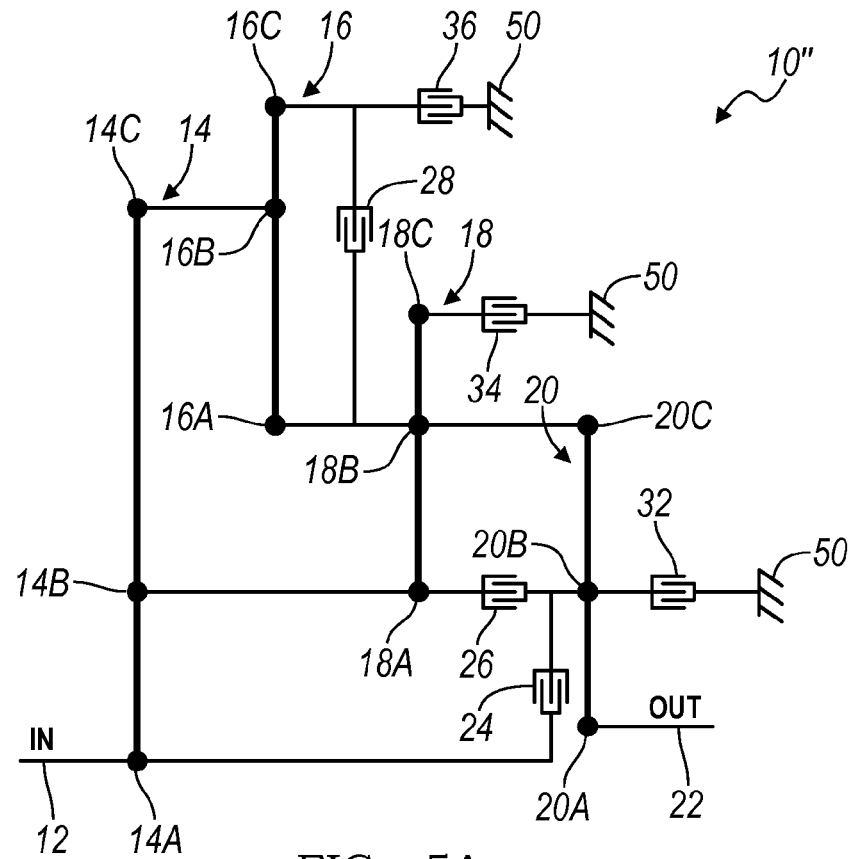
Figure 5B:
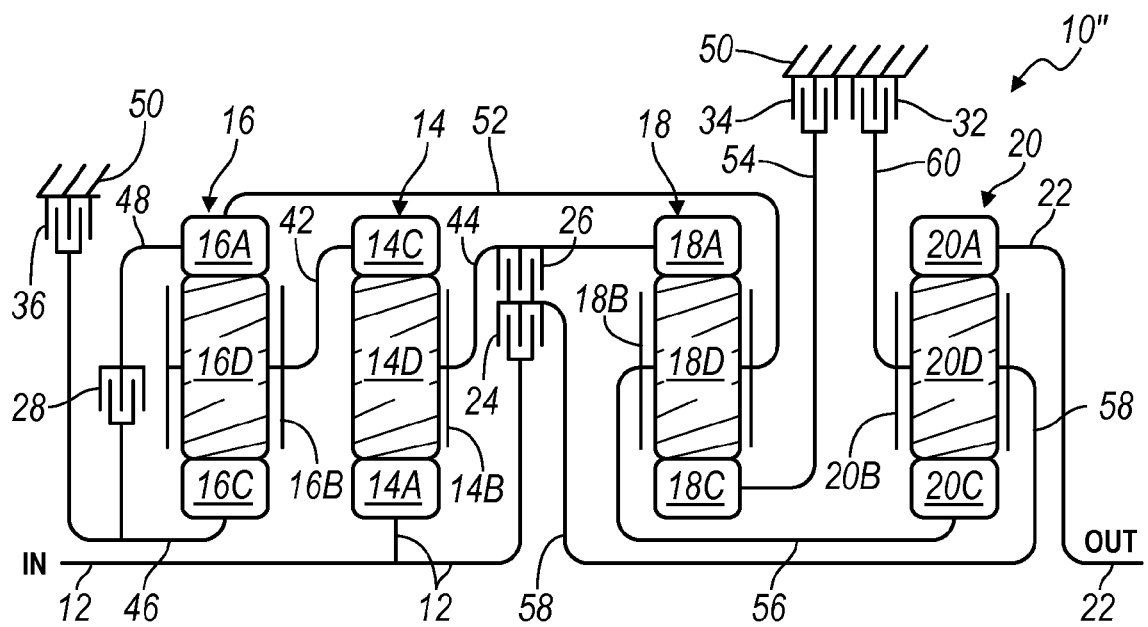
Figure 6A:
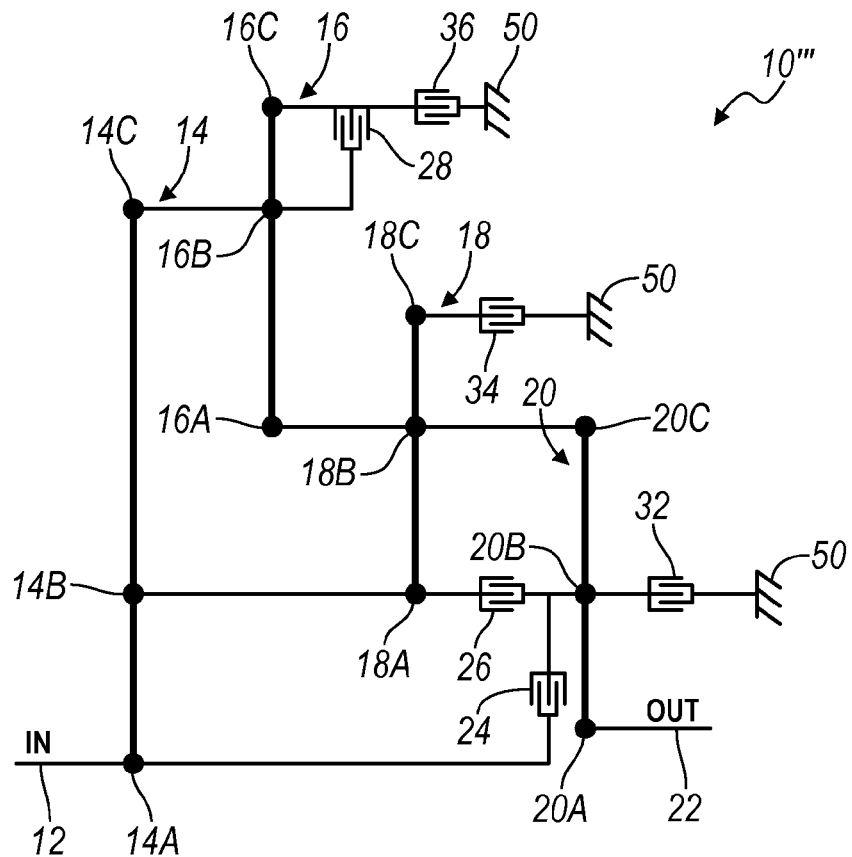
Figure 6B:
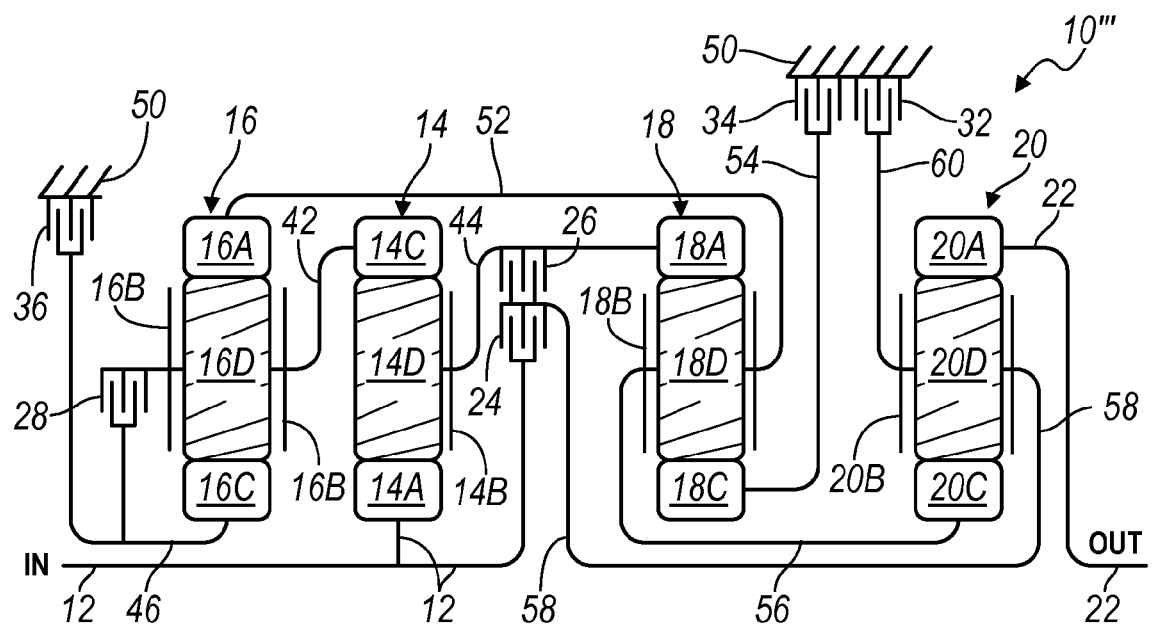

Referring now to FIG. 2, a stick diagram presents a schematic layout of an embodiment of the eleven speed transmission 10 according to one form of the present invention. In FIG. 2, the numbering from the lever diagram of FIG. 1 is carried over. The clutches and couplings are correspondingly presented whereas the nodes of the planetary gear sets now appear as components of planetary gear sets such as sun gears, ring gears, planet gears and planet gear carriers.

For example, the first planetary gear set 14 includes a sun gear member 14A, a ring gear member 14B, and a planet gear carrier member 14C that rotatably supports a set of planet gears 14D (only one of which is shown) The sun gear member 14A is connected for common rotation with the input shaft or member 12. The ring gear member 14C is connected for common rotation with a first shaft or interconnecting member 42. The planet carrier member 14B is connected for common rotation with a second shaft or interconnecting member 44. The set of planet gears 14D are each configured to intermesh with both the sun gear member 14A and the ring gear member 14C.

The second planetary gear set 16 includes a sun gear member 16C, a ring gear member 16A, and a planet gear carrier member 16B that rotatably supports a set of planetary gears 16D (only one of each is shown). The sun gear member 16C is connected for common rotation with the third shaft or interconnecting member 46. The ring gear member 16A is connected for common rotation with a fourth shaft or interconnecting member 48 and a fifth shaft or interconnecting member 52. The planet carrier member 16B is connected for common rotation with the first shaft or interconnecting member 42. The planet gears 16D are each configured to intermesh with both the ring gear member 16A and the sun gear member 16C.

The third planetary gear set 18 includes a sun gear member 18C, a ring gear member 18A, and a planet gear carrier member 18B that rotatably supports a set of planet gears 18D (only one of which is shown). The sun gear member 18C is connected for common rotation with a sixth shaft or interconnecting member 54. The planet carrier member 18B is connected for common rotation with the sixth shaft or interconnecting member 52 and a seventh shaft or interconnecting member 56. The ring gear member 18A is connected for common rotation with the second shaft or interconnecting member 44. The planet gears 18D are each configured to intermesh with both the sun gear member 18C and the ring gear member 18A.

The fourth planetary gear set 20 includes a sun gear member 20C, a ring gear member 20A and a planet gear carrier member 20B that rotatably supports a set of planet gears 20D (only one of which is shown). The sun gear member 20C is connected for common rotation with the seventh shaft or interconnecting member 56. The ring gear member 20A is connected for common rotation with the output shaft or member 22. The planetary gear carrier member 20B is connected for common rotation with an eighth shaft or interconnecting member 58 and a ninth shaft or interconnecting member 60. The planet gears 20D are each configured to intermesh with both the sun gear member 20C and the ring gear member 20A.

The input shaft or member 12 is continuously connected to an input source, such as an engine (not shown) or a turbine of a torque converter (not shown). The output shaft or member 22 is continuously connected with another output such as the final drive unit or transfer case (not shown).

The torque-transmitting mechanisms, including the first, second, and third clutches 24, 26, 28 and the first, second and third brakes 32, 34 and 36 allow for selective interconnection of the shafts or interconnecting members 42, 44, 46, 48, 52, 54, 56, 58 and 60 of the planetary gear sets 14, 16, 18, 20 and the housing 50.

For example, the first clutch 24 is selectively engageable to connect the input shaft or member 12 with the eighth shaft or interconnecting member 58. The second clutch 26 is selectively engageable to connect the second shaft or interconnecting member 44 with the eighth shaft or interconnecting member 58. The third clutch 28 is selectively engageable to connect the fourth shaft or interconnecting member 48 with the third shaft or interconnecting member 46.

The first brake 32 is selectively engageable to connect the ninth shaft or interconnecting member 60 with the stationary element or the transmission housing 50 in order to restrict the member 60 from rotating relative to the transmission housing 50. The second brake 34 is selectively engageable to connect the sixth shaft or interconnecting member 54 with the stationary element or the transmission housing 50 in order to restrict the member 54 from rotating relative to the transmission housing 50. The third brake 36 is selectively engageable to connect the third shaft or interconnecting member 46 with the stationary element or the transmission housing 50 in order to restrict the member 46 from rotating relative to the transmission housing 50. In turn, the components of the planetary gear sets connected to each of the connecting members are also connected or restricted accordingly.

Referring now to FIG. 2 and FIG. 3, the operation of the eleven speed transmission 10 embodiment will be described. It will be appreciated that transmission 10 is capable of transmitting torque from the input shaft or member 12 to the output shaft or member 22 in eleven or more forward speed torque ratios and at least one reverse speed or torque ratio. Each forward and reverse speed or torque ratio is attained by engagement of one or more of the torque-transmitting mechanisms (i.e. first clutch 24, second clutch 26, third clutch 28, first brake 32, second brake 34 and third brake 36), as will be explained below.

FIG. 3 is a truth table presenting the various combinations of torque-transmitting mechanisms that are activated or engaged to achieve the various gear states. An "X" in the box means that the particular clutch or brake is engaged to achieve the desired gear state. An "O" in the box means that a particular clutch or brake is engaged but not carrying torque (no "O's" are present in FIG. 3). Actual numerical gear ratios of the various gear states are also presented although it should be appreciated that these numerical values are exemplary only and that they may be adjusted over significant ranges to accommodate various applications and operational criteria of the transmission 10. Of course, other gear ratios are achievable depending on the gear diameter, gear teeth count and gear configuration selected.

For example to establish a reverse gear, the third clutch 28, the first brake 32 and the second brake 34 are engaged or activated. The third clutch 28 connects the third shaft or interconnecting member 46 with the fourth shaft or interconnecting member 48. The first brake 32 connects the ninth shaft or interconnecting member 60 with the stationary element or the transmission housing 50 in order to restrict the member 60 from rotating relative to the transmission housing 50, which restricts the carrier member 20B from rotating relative to the transmission housing 50. The second brake 34 connects the sixth shaft or interconnecting member 54 with the stationary element or the transmission housing 50 in order to restrict the member 54 from rotating relative to the transmission housing 50, which restricts the sun gear 18C from rotating relative to the transmission housing 50. Likewise, eleven forward ratios are achieved through different combinations of clutch and brake engagement, as shown in FIG. 3, by way of example.

Further, the present invention contemplates that at least one additional reverse gear (REV2) is achievable by the transmission of FIGS. 1 and 2. As shown in FIG. 3., a second reverse gear ratio is achieved through selective activation or engagement of the first brake 32, the second brake 34 and the third brake 36. The first brake 32 connects the ninth shaft or interconnecting member 60 with the stationary element or the transmission housing 50 in order to restrict the member 60 from rotating relative to the transmission housing 50, which restricts the carrier member 20B from rotating relative to the transmission housing 50. The second brake 34 connects the sixth shaft or interconnecting member 54 with the stationary element or the transmission housing 50 in order to restrict the member 54 from rotating relative to the transmission housing 50, which restricts the sun gear 18C from rotating relative to the transmission housing 50. The third brake 36 connects the third shaft or interconnecting member 46 with the stationary element or the transmission housing 50 in order to restrict the member 46 from rotating relative to the transmission housing 50, which restricts the sun gear 16C from rotating relative to the transmission housing 50.

It will be appreciated that the foregoing explanation of operation and gear states of the eleven speed embodiment of transmission 10 assumes, first of all, that all the clutches not specifically referenced in a given gear state are inactive or disengaged and, second of all, that during gear shifts, i.e., changes of gear state, between at least adjacent gear states, a clutch engaged or activated in both gear states will remain engaged or activated.

Additionally, the present invention contemplates multiple interconnections for the third clutch 28 as illustrated in FIGS. 4A, 4B, 5A, 5B, 6A and 6B.

Figure 7:
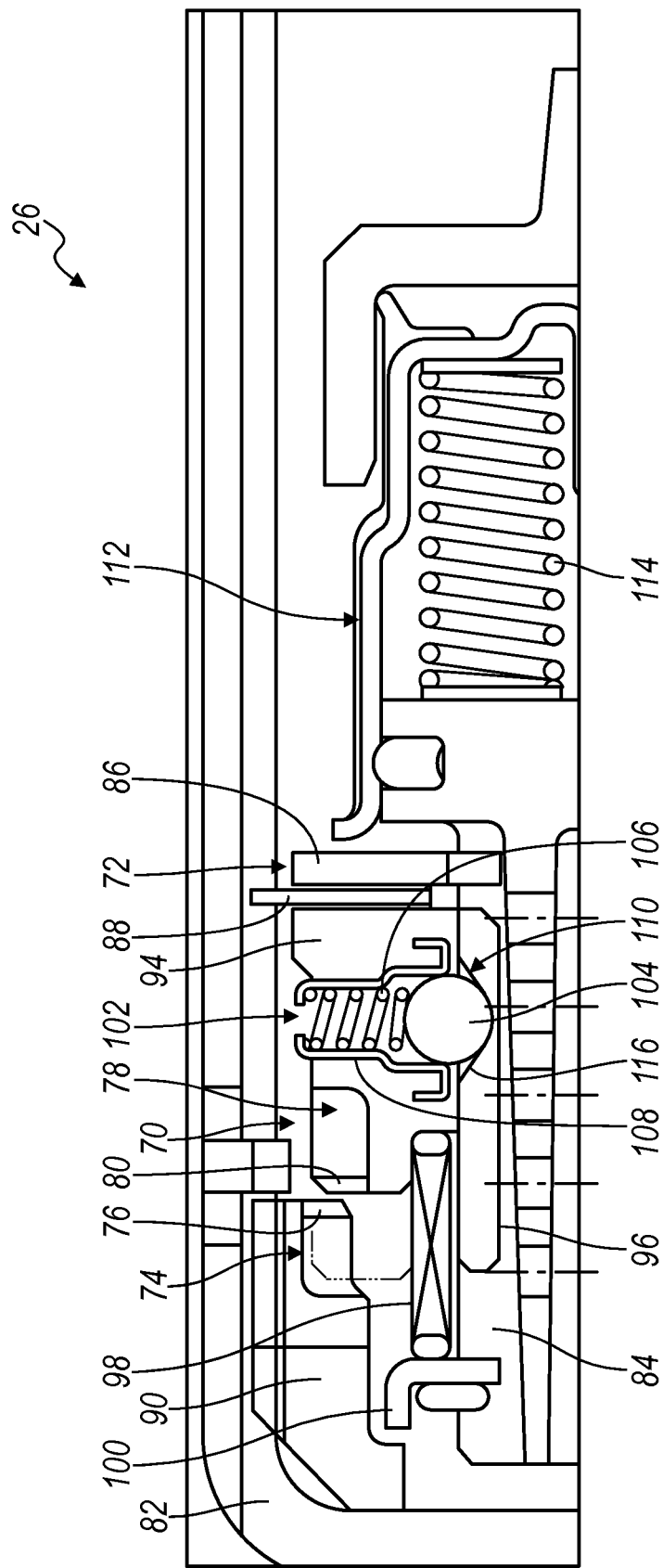
FIG. 7 is a cross-sectional view of a torque transmitting mechanism of the transmission of FIGS. 1, 2, 4A, 4B, 5A, 5B, 6A, and/or 6B, in accordance with the principles of the present invention.

Referring now to FIG. 7, the second clutch 26 will be described in further detail. The second clutch 26 is a rotating clutch that includes a low-loss binary clutch 70 and a friction clutch 72. The binary clutch 70 is disposed in parallel with and adjacent to the friction clutch 72.

The low-loss binary clutch 70 is an on-off type clutch, such as a dog clutch, that may be capable of carrying high levels of torque after full engagement. For example, the binary clutch 70 may be a dog clutch that has a first half 74 having a surface bearing a first set of teeth 76 extending from the surface of the first half 74 and a second half 78 having a surface bearing a second set of teeth 80 extending from the surface of the second half 78. The surface of the first half 74 has grooves formed therein separating the teeth 76, and the surface of the second half 78 also has grooves formed therein separating the teeth 80.

The first and second sets of teeth 76, 80 and grooves are selectively engageable with one another to engage the binary clutch 70. Thus, the binary clutch 70 may have two halves 74, 78 having opposed teeth 76, 80 and grooves, the first half 74 which is connected to an outer member 82 or another member through a connecting structure 90, and the second half 78 which is slidingly connected to an inner clutch hub 84 or other member through a clutch structure 94 along a sliding spline 96. The binary clutch 70 engages, not by friction, but by interference and meshing of the teeth 76, 80 and grooves of the halves 74, 78 of the binary clutch 70. The binary clutch 70 may have near zero, or negligible, spin losses; therefore, the binary clutch 70 may be a high capacity clutch with no compliance and zero or negligible slip.

The friction clutch 72 of the second clutch 26 may be a low-capacity friction clutch having any desirable number of interleaved clutch plates 86, 88, which may be friction discs. For example, the friction clutch 72 may have one, two, or more interleaved clutch plates 86, 88. The friction clutch plates 86, 88 may have slippage when applied, providing for a smooth shifting transition.

In the illustrated embodiment, the friction clutch 72 includes a first clutch plate 86 disposed adjacent to a second clutch plate 88. The first clutch plate 86 is splined to the inner clutch hub 84, such that the first clutch plate 86 rotates with the inner clutch hub 84. The second clutch plate 88 is splined to the outer member 82, such that the second clutch plate 88 rotates with the outer member 82. One or more of the friction clutch plates 86, 88 may have friction material (not shown) disposed on a surface of the clutch plate 86, 88 if desired.

A clutch structure 94 attached to the second half 78 of the binary clutch 70 acts as a backing plate for the clutch plates 86, 88 to react against. The clutch structure 94 is disposed adjacent to the second clutch plate 88. The clutch structure 94 is slidingly splined to the inner clutch hub 84, such that the clutch structure 94 rotates with the inner clutch hub 84 but may slide axially along a sliding spline 96. The sliding spline 96 includes teeth and grooves running in axial direction (from left to right in FIG. 7), such that teeth and grooves formed in the inner clutch hub 84 are slidingly mated with teeth and grooves formed in the clutch structure 94.

One or more springs 98, such as a coil springs, are disposed between the clutch structure 94 and a piston stop 100. The piston stop 100 is connected to the inner clutch hub 84, in this embodiment. One or more spring-ball structures 102 are attached to the clutch structure 94 and the second half 78 of the binary clutch 70. The spring-ball structures 102 may be press-fit to the clutch structure 94, and they may be disposed radially around the clutch structure 94, by way of example. In the cross-sectional view of FIGS. 7-9, only one spring-ball structure 102 is shown.

The spring-ball structure 102 includes a ball 104, a spring 106, such as a coil spring, disposed radially outwardly from the ball 104 and contacting the ball 104, and a surrounding structure 108 housing the spring 106 and a portion of the ball 104. The inner clutch hub 84 has a portion forming a curved detent 110 therein.

A rotating piston 112 is movably connected to the inner clutch hub 84; the piston 112 rotates with the inner clutch hub 84, but the piston 112 is configured to move axially along the inner clutch hub 84. The piston 112 houses a piston spring 114, such as a coil spring, in this embodiment.

In FIG. 7, the second clutch 26 is illustrated in the unapplied position. As such, the piston 112 does not contact the friction clutch 72 or the binary clutch. The ball-spring structure 102 is in the detent position; in other words, the ball 104 is disposed in the detent 110 of the inner clutch hub 84. The ramp surface 116 of the detent 110 and the spring 106 of the spring-ball structure 102 hold the ball 104 in the detent 110 when no piston force is applied.

Figure 8:
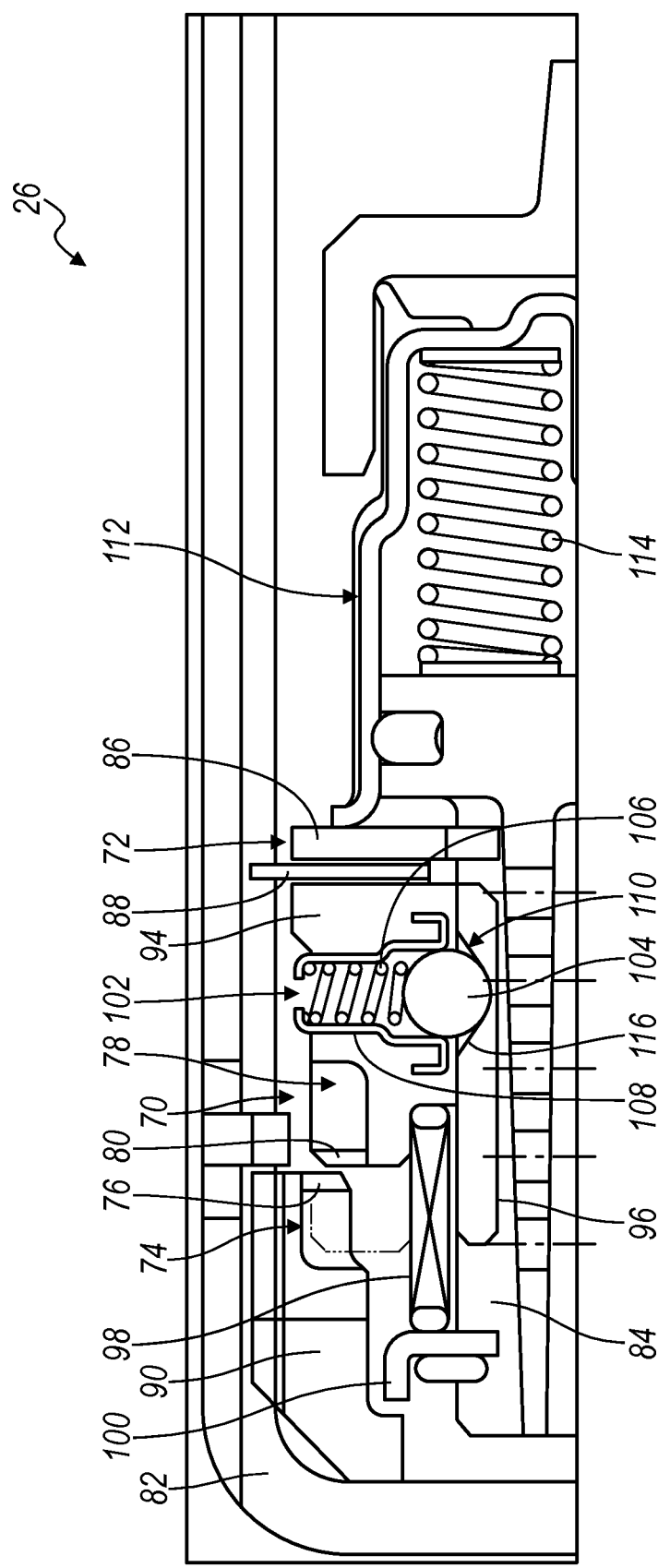
FIG. 8 is a cross-sectional view of the torque transmitting mechanism of FIG. 7 in a partially engaged position, according to the principles of the present invention.

Referring now to FIG. 8, when the piston 112 is initially applied, the piston 112 moves axially along a central axis of the transmission 10 and contacts the first clutch plate 86 of the friction clutch 72. The piston 112 then compresses the first clutch plate 86 into the second clutch plate 88. The piston 112 further pushes both clutch plates 86, 88 against the clutch structure 94. This results in synchronizing the motion of the outer member 82 and the inner clutch hub 84. In other words, when the clutch plates 86, 88 of the friction clutch 72 are engaged, the outer member 82 and the inner clutch hub 84 rotate together. However, the ramp surface 116 provides resistance to the friction clutch apply force, as applied by the piston 112 through the clutch plates 86, 88 against the clutch structure 94. The ramp surface 116 angle may be tuned to provide the desired amount of resistance; the steeper the ramp surface 116, the more force required to push the ball 104 out of the detent 110.

Figure 9:
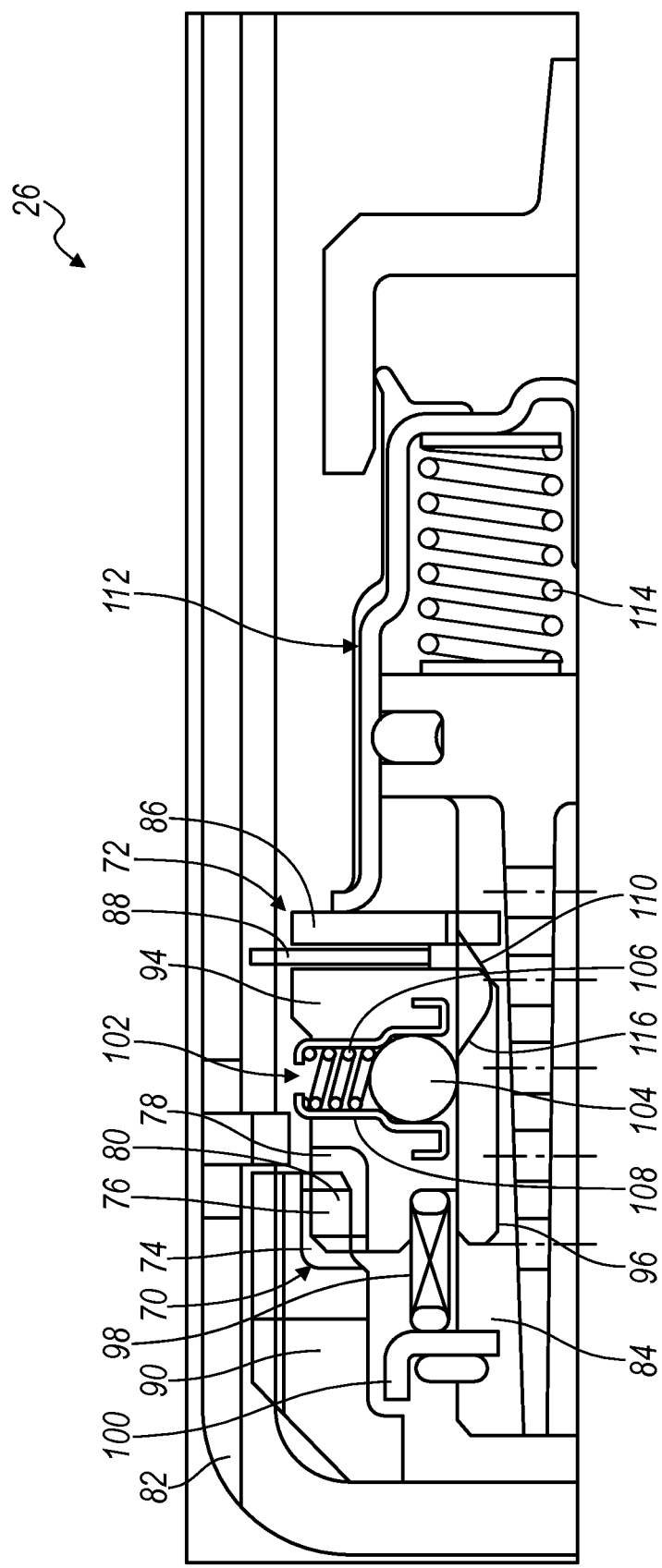
FIG. 9 is a cross-sectional view of the torque transmitting mechanism of FIGS. 7-8 in a fully engaged position, in accordance with the principles of the present invention.

Thus, after the friction clutch 72 is engaged, additional force may be applied to the piston 112 to push the friction clutch plates 86, 88 axially further to the left (in the orientation of FIG. 8) and to move the clutch structure 94 axially along the sliding spline 96. With reference to FIG. 9, the additional force may be applied through the piston 102 to move the ball 104 along the ramp surface 116 and out of the detent 110. As the ball 104 travels up the ramp surface 116, it compresses the spring 106 in the ball-spring structure 108. Accordingly, the piston 102 is operable to push the friction clutch plates 86, 88 and the clutch structure 94 axially along the transmission axis, and to push the ball 104 up the ramp structure 116, thereby compressing the spring 106 with the ball 104. Upon moving the ball 104 up the ramp structure 116, the clutch structure 94 is also pushed into the return spring 98 and compresses the return spring 98. The piston 112 is operable to press the clutch plates 86, 88, the clutch structure 94, and the return spring 98 against the piston stop 100.

As the piston 112 moves the clutch structure 94 axially along the sliding spline 96, the second half 78 of the binary clutch 70 (which is connected to or formed with the clutch structure 94) moves into contact with the first half 74 of the binary clutch 70. Before the binary clutch halves 74, 78 are engaged, the friction clutch 72 is engaged, and therefore, the outer member 82 and the inner clutch hub 84 are rotating together when the binary clutch halves 74, 78 are engaged. In other words, the piston 112 is operable to first engage the friction clutch 72 before engaging the binary clutch 70. Accordingly, the first set of teeth and grooves 76 and the second set of teeth and grooves 80 can smoothly engage, since both halves 74, 78 of the binary clutch 70 are rotating together when the halves 74, 78 are engaged.

With the illustrated configuration of the parallel clutches 70, 72 of the second clutch 26, the friction clutch 72 may be sized to carry a low torque, or to have a low-torque capacity. The friction clutch 72 need not be sized for a high torque capacity because the binary clutch 70 has a high torque capacity. The friction clutch 72 in the parallel arrangement of FIGS. 7-9 causes the binary clutch 70 to be engaged when the binary clutch halves 74, 78 are rotating together, and therefore, the binary clutch 70 can be engaged smoothly even while the outer member 82 and the inner clutch hub 84 are rotating, because the outer member 82 and the inner clutch hub 84 are rotating together when the binary clutch 70 is engaged. Thus, the opposed surfaces of the clutch halves 74, 78 are engaged without an abrupt feeling of heavy shifting that would be apparent to vehicle occupants.

The return spring 98 exerts a force on the clutch structure 94. Accordingly, when the piston 112 moves back to the right (in the orientation of FIGS. 7-9), the return spring 98 expands and moves the clutch structure 94 and the second half 78 away from the first half 74 of the binary clutch 70 to disengaged the binary clutch halves 74, 78.

The second clutch 26 is placed in the transmission 10 power flow in the location explained above in FIGS. 1 and 2. Accordingly, the inner clutch hub 84 is connected to either the second node 20B of the fourth planetary gear set 20 or the first node 18A of the third planetary gear set 18. Similarly, the outer member 82 is connected either the second node 20B of the fourth planetary gear set 20 or the first node 18A of the third planetary gear set 18. In the illustrated embodiment of FIGS. 7-9, the outer member 82 is connected to the first node 18A of the third planetary gear set 18 and the second node 14B of the first planetary gear set 14, and the inner clutch hub 84 is connected to the second node 20B of the fourth planetary gear set 20. Thus, the first half 74 of the binary clutch 70 and the second clutch plate 88 are connected to the first node 18A of the third planetary gear set 18 and the second node 14B of the first planetary gear set 14, and the second half 78 of the binary clutch 70 and the first clutch plate 86 are connected to the second node 20B of the fourth planetary gear set 20. Accordingly, when the second clutch 26 is engaged, it connects the second node 20B of the fourth planetary gear set 20 and the first node 18A of the third planetary gear set 18 for common rotation with each other.

The description of the invention is merely exemplary in nature and variations that do not depart from the gist of the invention are intended to be within the scope of the invention. For example, the friction clutch 72 and the binary clutch 70 may be used with any of the other clutches or brakes of the transmission 10. Such variations are not to be regarded as a departure from the spirit and scope of the invention.

What is claimed is:
1. A transmission comprising:
   an input member;
   an output member;
   first, second, third and fourth planetary gear sets each having first, second and third members, and wherein the input member is continuously connected for common rotation with the first member of the first planetary gear set and the output member is continuously connected for common rotation with the first member of the fourth planetary gear set;

a first interconnecting member continuously interconnecting the second member of the first planetary gear set with the first member of the third planetary gear set;

a second interconnecting member continuously interconnecting the third member of the first planetary gear set with the second member of the second planetary gear set; and a third interconnecting member continuously interconnecting the first member of the second planetary gear set with the second member of the third planetary gear set and the third member of the fourth planetary gear set;

six torque transmitting mechanisms wherein three of the six torque transmitting mechanisms are each selectively engageable to interconnect at least one of the first, second and third members of the first, second, third, and fourth planetary gear sets with at least one other of the first, second, third members of the first, second, third, and fourth planetary gear sets and wherein three of the six torque transmitting mechanisms are each selectively engageable to interconnect at least one of the first, second and third members of the first, second, third, and fourth planetary gear sets with a stationary member, wherein the six torque transmitting mechanisms are selectively engageable in combinations of at least three to establish a plurality of forward speed ratios and at least one reverse speed ratio between the input member and the output member, a first of the six torque transmitting mechanisms is selectively engageable to interconnect the second member of the first planetary gear set and the first member of the third planetary gear set with the second member of the fourth planetary gear set, a second of the six torque transmitting mechanisms is selectively engageable to interconnect the first member of the first planetary gear set and the input member with the second member of the fourth planetary gear set, a third of the six torque transmitting mechanisms is selectively enqaqeable to interconnect the second member of the fourth planetary gear set with the stationary member, a fourth of the six torque transmitting mechanisms is selectively enqaqeable to interconnect the third member of the third planetary gear set with the stationary member, and a fifth of the six torque transmitting mechanisms is selectively enqaqeable to interconnect the third member of the second planetary gear set with the stationary member; and wherein the first torque transmitting mechanisms is a friction clutch having a backing plate structure against which the friction clutch acts, a biasing member disposed in the backing plate structure with a ball disposed adjacent to the biasing member, and a binary clutch disposed adjacent to the backing plate structure, and wherein the backing plate structure includes a first set of teeth opposing and for selective engagement with a second set of teeth of the second member.

2. The transmission of claim 1, wherein the first torque transmitting mechanism further comprises an actuator configured to engage both the friction clutch and the binary clutch, the backing plate structure being configured to selectively apply pressure to engage the binary clutch.

3. The transmission of claim 2, wherein the actuator is configured to apply a first pressure to the friction clutch to engage the friction clutch while the binary clutch remains disengaged in a first engaged position, the actuator being further configured to apply a second pressure to the friction clutch to engage the binary clutch in a second engaged position, the second pressure being greater than the first pressure.

4. The transmission of claim 3, wherein the biasing member is a first biasing member, the first torque transmitting mechanism further comprising a second biasing member and a stop, the second biasing member being disposed between the stop and the backing plate structure, the second biasing member being configured to bias the backing plate structure away from the binary clutch.

5. The transmission of claim 4, further comprising a detent member having a surface forming a curved detent therein, the ball being biased into the curved detent by the first biasing member, the ball being configured to seat in the curved detent in an unengaged position of the first torque transmitting mechanism and in the first engaged position, the actuator being operable to unseat the ball from the curved detent in the second engaged position, the backing plate structure being configured to slide axially with respect to the detent member when being acted on by the actuator in the second engaged position, the surface forming the detent having a ramped surface edge, the ball being configured to roll up the ramped surface edge and compress the first biasing member in the second engaged position.

6. The transmission of claim 5, further comprising a fourth interconnecting member continuously connected to the second member of the fourth planetary gear set, wherein the binary clutch is a dog clutch, the binary clutch being disposed adjacent to the friction clutch, the friction clutch being disposed between the binary clutch and the actuator, wherein the binary clutch has a first half having the second set of teeth and a second half having the second set of teeth, the first half being configured to rotate with the fourth interconnecting member and the second half being configured to rotate with the first interconnecting member, and wherein the friction clutch has at least one first clutch plate and at least one second clutch plate, the first clutch plate being configured to rotate with the fourth interconnecting member and the second clutch plate is configured to rotate with the first interconnecting member.

7. The transmission of claim 6, wherein a sixth of the six torque transmitting mechanisms is selectively engageable to interconnect the first member of the second planetary gear set and the second member of the third planetary gear set with the third member of the second planetary gear set.

8. The transmission of claim 6, wherein a sixth of the six torque transmitting mechanisms is selectively engageable to interconnect the first member of the second planetary gear set and the second member of the third planetary gear set with the second member of the second planetary gear set.

9. The transmission of claim 6, wherein a sixth of the six torque transmitting mechanisms is selectively engageable to interconnect the second member of the second planetary gear set and the third member of the first planetary gear set with the third member of the second planetary gear set.

10. The transmission of claim 6, wherein the first member of the first planetary gear set, the third member of the second planetary gear set, the third member of the third planetary gear set and the third member of the fourth planetary gear set are sun gears, the second members of the first, second, third and fourth planetary gear sets are carrier members and the third member of the first planetary gear set, the first member of the second planetary gear set, the first member of the third planetary gear set and the first member of the fourth planetary gear set are ring gears.

11. A transmission comprising:

an input member;

an output member;

first, second, third and fourth planetary gear sets each having a sun gear, a carrier member and a ring gear, wherein the input member is continuously connected for common rotation with the sun gear of the first planetary gear set, and wherein the output member is continuously connected for common rotation with the ring gear of the fourth planetary gear set;

a first interconnecting member continuously interconnecting the carrier member of the first planetary gear set with the ring gear of the third planetary gear set;

a second interconnecting member continuously interconnecting the ring gear of the first planetary gear set with the carrier member of the second planetary gear set;

a third interconnecting member continuously interconnecting the ring gear of the second planetary gear set with the carrier member of the third planetary gear set and the sun gear of the fourth planetary gear set;

a first torque transmitting mechanism selectively engageable to interconnect the sun gear of the first planetary gear set and the input member with the carrier member of the fourth planetary gear set;

a second torque transmitting mechanism selectively engageable to interconnect the carrier member of the first planetary gear set and the ring gear of the third planetary gear set with the carrier member of the fourth planetary gear set;

a third torque transmitting mechanism selectively engageable to interconnect the carrier member of the fourth planetary gear set with a stationary member;

a fourth torque transmitting mechanism selectively engageable to interconnect the sun gear of the third planetary gear set with the stationary member;

a fifth torque transmitting mechanism selectively engageable to interconnect the sun gear of the second planetary gear set with the stationary member; and a sixth torque transmitting mechanism selectively engageable to interconnect the ring gear of the second planetary gear set and the carrier member of the third planetary gear get set with one of the following: a) the sun gear of the second planetary gear set; and b) the carrier member of the second planetary gear set and the ring gear of the first planetary gear set, wherein the torque transmitting mechanisms are selectively engageable in combinations of at least three to establish a plurality of forward speed ratios and at least one reverse speed ratio between the input member and the output member, wherein the second torque transmitting mechanism includes a friction clutch having a backing plate structure against which the friction clutch acts, a first biasing member disposed in the backing plate structure with a ball disposed adjacent to the first biasing member, and a binary clutch disposed adjacent to the backing plate structure, wherein the second torque transmitting mechanism further comprises an actuator configured to engage both the friction clutch and the binary clutch, the actuator being configured to apply a first pressure to the friction clutch to engage the friction clutch while the binary clutch remains disengaged in a first engaged position, and the actuator being configured to apply a second pressure to the friction clutch to engage the binary clutch in a second engaged position, the second pressure being greater than the first pressure, wherein the second torque transmitting mechanism further comprises a second biasing member and a stop, the second biasing member being disposed between the stop and the backing plate structure, the second biasing member being configured to bias the backing plate structure away from the binary clutch, the binary clutch being disposed adjacent to the friction clutch, and the friction clutch being disposed between the binary clutch and the actuator, wherein the second torque transmitting device further comprises a detent member having a surface forming a curved detent therein, the ball being biased into the curved detent by the first biasing member, the ball being configured to seat in the curved detent in an unengaged position of the second torque transmitting mechanism and in the first engaged position, the actuator being operable to unseat the ball from the curved detent in the second engaged position, the backing plate structure being configured to slide axially with respect to the detent member when being acted on by the actuator in the second engaged position, the surface forming the detent having a ramped surface edge, the ball being configured to roll up the ramped surface edge and compress the first biasing member in the second engaged position.

* * * * *